United States Patent
Ii et al.

(10) Patent No.: US 6,206,381 B1
(45) Date of Patent: Mar. 27, 2001

(54) MULTI-LAYER METAL GASKET

(75) Inventors: Naoki Ii; Hiroshi Uemura; Yuji Fukui, all of Osaka (JP)

(73) Assignee: Nippon Gasket Co., Ltd., Osaka (JP)

( * ) Notice: Subject to any disclaimer, the term of this patent is extended or adjusted under 35 U.S.C. 154(b) by 0 days.

(21) Appl. No.: 09/184,592

(22) Filed: Nov. 3, 1998

(30) Foreign Application Priority Data

Nov. 14, 1997 (JP) ........................................... 9-329644

(51) Int. Cl.[7] .............................. F16J 15/08; F02F 11/00
(52) U.S. Cl. .................................... 277/593; 277/595
(58) Field of Search .............................. 277/591, 593, 277/594, 595, FOR 248

(56) References Cited

U.S. PATENT DOCUMENTS

| | | | |
|---|---|---|---|
| 4,203,608 | * | 5/1980 | Nicholson . |
| 4,836,562 | * | 6/1989 | Yoshino . |
| 5,226,663 | * | 7/1993 | Miyaoh . |
| 5,395,128 | * | 3/1995 | Udagawa . |
| 5,560,623 | * | 10/1996 | Yoshino . |
| 5,580,065 | * | 12/1996 | Ueta . |
| 5,586,776 | * | 12/1996 | Kubouchi et al. . |

FOREIGN PATENT DOCUMENTS

| | | | |
|---|---|---|---|
| 000230804 | * | 8/1987 | (EP) . |
| 363246572 | * | 10/1988 | (JP) . |
| 4-077833 | | 1/1992 | (JP) . |
| 8-033178 | | 3/1996 | (JP) . |

* cited by examiner

*Primary Examiner*—Anthony Knight
*Assistant Examiner*—John L. Beres
(74) *Attorney, Agent, or Firm*—Browdy and Neimark (57) ABSTRACT

A metal gasket is disclosed in which a sealing stress exerted on a deck-surface from any one of confronting bead plates is dispersed slantwise along the direction leaving its associated cylinder bore aperture so that the cylinder bores are protected from deformation owing to the high sealing stress occurring in the open-end portions of the cylinder bores. The bead plates have sealing beads confronting flanges of an first intermediate plates at their borderlines smaller radially of their associated cylinder bore apertures while confronting the first intermediate plate, less in thickness than the flanges, at their borderlines larger radially of their associated apertures. The sealing stress on the deck-surfaces of the cylinder block and cylinder liner due to deformation of the beads may be dispersed uniformly over the flanges to thereby reduce the influence of the sealing stress on the liner section of the cylinder liner.

4 Claims, 4 Drawing Sheets

MULTI-LAYER METAL GASKET

BACKGROUND OF THE INVENTION

1. Field of the Invention

The present invention relates to a metal gasket for sealing between a pair of confronting surfaces and, more particularly, to a multi-layer metal gasket interposed and clamped between the confronting surfaces of the cylinder block and cylinder head of, for example, the internal combustion engines.

2. Description of the Prior Art

Conventionally, the gaskets have been interposed and clamped between the confronting surfaces of the cylinder block and cylinder head of the multicylinder engine by means of the bolts. Various types of gaskets have been developed to insure a gastight fit between the confronting surfaces of the cylinder block and cylinder head.

Recent research and development on engines has been concentrated on less weight, more compactness or higher horsepower developed and the cylinder heads of aluminum alloy have prevailed for less weight. It has been well known that the aluminum alloy is light in weight, but less in rigidity. The engines of aluminum alloy display the great thermal expansion and/or contraction in accordance with the variation of temperature, which depends on the operating conditions of the engines. As a result, the heat loads owing to the stresses repeatedly exerted during the engine operation and the changes in engine processes render strains to the gaskets, which may cause cracks in the gaskets resulting in a steep reduction in the surface pressure, or the sealing stress, at the interfaces of engine parts with the troubles such as leakage of gases out of the interfaces.

Heretofore various types of metal gasket have been developed for sealing means instead of asbestos-made gaskets. The metal gaskets are in general provided therein with apertures in concentric alignment with cylinder bores which are in the cylinder block for reciprocation of pistons, the apertures being each surrounded with annular corrugations, or sealing beads. The gaskets further have other relatively small holes or perforations for clamping bolts or the like, which are also surrounded with annular corrugations, or sealing beads.

With the metal gasket being interposed and clamped or held between the cylinder block and cylinder head by means of the bolts, the sealing beads may make elastic metal-to-metal contact with the confronting surfaces, especially, at the annular areas around each of the cylinder bore apertures and perforations for coolant, oil, bolts or the like to thereby provide an increase in sealing stress at these areas while adequately sealing the cylinder bores, coolant and oil passages and bolt holes.

Well-known prior metal gaskets are the multi-layer metal gaskets as disclosed, for example, in Japanese Patent Publication Nos. 77833/1992 and 33178/1996. The metal gaskets are usually of plural metal plates comprising a pair of core plates with sealing beads arranged in an overlapped relation, and two sheets of intermediate plates interposed between the core plates. In the prior metal gaskets disclosed in the above citations, any one of the intermediate plates is partially folded back so as to have turns and flanges, while the other intermediate plate is provided for adjusting the thickness in plates.

The multi-layer metal gasket shown in the above citation No. 77833/1992 has two sheets of intermediate plates, the first one of which is partially folded back into flanges around the cylinder bore apertures, the second plate being less in thickness than that of the first plate and arranged spaced apart from the folded flange while in contact with the crests of the corrugations, or the raised surfaces of the sealing beads, of the core plates. The metal gasket as described just above is adapted to compensate the clearances between the confronting surfaces while providing the double sealing areas around the cylinder bore apertures. The core plate with which the second thinner intermediate plate is in contact may be prevented from flattering out of the sealing beads, resulting in substantially steady sealing performance.

The multi-layer metal gasket disclosed in the above-citation No. 33178/1996, in addition to the advantages in the gasket described just above, may protect equally the sealing beads of a pair of core plates by the prevention of the flattering phenomenon of the sealing beads in the core plate with which the second intermediate plate has no contact.

The intermediate plate in the metal gasket is ordinary rendered greater in thickness in annular areas adjacent to the cylinder bore apertures than in the remainder of the plate by folding back the intermediate plate at the annular areas around the apertures. On most metal gaskets the annular portions greater in thickness in the intermediate plate may compensate the clearances between the confronting surfaces, which are apt to widen at the circumferential area of the cylinder bore apertures to thereby protect the clearances between the confronting surfaces from the variations owing to the high pressure and heat of the combustion gases. Hence, the thicker portions cooperate with the corrugations, or sealing beads, to provide double-sealed areas higher in the surface pressure, or the sealing stress, around the apertures, resulting in preventing the leakage of combustion gases.

On the cylinder block made of cast aluminum alloy it has been, however, experienced that the thicker portions in the metal gasket may cause the excessive concentration of surface pressure, or sealing stress, between the confronting surfaces on the circumferential areas of the apertures, irrespective of whether the cylinder liners are fitted. The concentration of the sealing stress renders the strain greater at the annular opened ends of the cylinder bores, or at the annular cornered ends at which the cylinder walls are abutted against the flanged portions of the cylinder liners fitted in the cylinder bores. The strain brings about the reduction in engine performance.

Deformation in the cylinder bores due to the strain rises the fuel consumption rate, increases the oil consumption, causes the premature wear owing to unexpected friction occurring between the cylinder walls and piston rings, and if worst comes to worst, results in seizure owing to scarfing.

On most cylinder blocks of cast aluminum alloy lacking in the hardness at the open-deck surface, the metal gasket has been required to provide compensating means for protecting the corrugations, or sealing beads, from the flattering out or permanent set in fatigue by dispersing the surface pressure, or sealing stress, in the deck-surface for areas other than the areas adjacent to the cylinder bores. As a result, the sealing stress in the deck surface does not concentrate excessively on the specific areas adjacent to the cylinder bores, but disperses uniformly whereby the cylinder bores are protected from deformation due to strain while both sealing performance and engine performance may be improved.

SUMMARY OF THE INVENTION

The present invention has for its primary object to provide a metal gasket adapted to be compressively clamped between the confronting surfaces of a pair of structural components, more particularly a metal gasket in which the surface pressure, or the sealing stress, does not concentrate excessively on the specific areas adjacent to the cylinder bores, but disperses uniformly whereby both sealing performance and engine performance may be improved. To this end, the present invention provided a metal gasket in which the sealing stress generating in the confronting surfaces of the structural components owing to the cooperation of the beads with their associated flanges under clamping loads disperses uniformly over the flanges around their associated apertures and is greater in its magnitude than that at the residual areas other than the areas of the flanges, whereby the clearances between the confronting surfaces at the areas adjacent to the cylinder bore apertures may be compensated while the corrugations, or sealing beads, may be protected from flattering out, or permanent set in fatigue.

Another object of the present invention is to provide a metal gasket comprising a first bead plate formed with first beads extending around first cylinder bore apertures, a second bead plate formed with second beads extending in coincidence with the first beads around second cylinder bore apertures which are in concentric alignment with the first apertures, a first intermediate plate having third apertures in alignment with the first and second apertures and flanges folded back on a side confronting the first bead plate, the first intermediate plate being interposed between the first and second bead plates, a second intermediate plate having a thickness less than that of the flanges of the first intermediate plate and further having apertures larger in diameter than the third apertures, the second intermediate plate being in contact with the first intermediate plate on the side where the flanges are overlapped, the first and second beads being arranged in such a manner that first and second crests thereof are offset in outward directions spaced apart from each other with respect to confronting surfaces of the bead plates, the first beads being defined by borderlines smaller radially of their associated apertures and borderlines larger radially of their associated apertures, the flanges being in opposition to the radially smaller borderlines of the first beads, the second intermediate plate being in opposition to the radially larger borderlines of the first bead plate, and the flanges of the first intermediate plate being arranged in opposition to the second intermediate plate so as to make no interference between extremities of the flanges and circular edges around the apertures of the second intermediate plate somewhere midway between the smaller and larger annular borderlines of the first beads.

A further object of the present invention is to provide a metal gasket wherein the flanges have the extremities which terminate somewhere midway between the smaller and larger annular borderlines of the first beads.

A further object of the present invention is to provide a metal gasket wherein the first and second beads are formed independently around their associated first and second apertures.

An additional object of the present invention is to provide a metal gasket wherein the flanges are each spaced apart from the first intermediate plate to provide clearance therebetween.

Another object of the present invention is to provide a metal gasket wherein the first and second beads of the first and second bead plates each have a widthwise cross-section of any one of arced segment and trapezoid.

Another object of the present invention is to provide a metal gasket wherein the first and second beads each are equal in height at both of radially smaller and larger borderlines thereof, the first bead plate under no clamping load is in contact with the flanges of the first intermediate plate while being spaced apart from the second intermediate plate, and the second bead plate is in contact with the first intermediate plate.

Another object of the present invention is to provide a metal gasket wherein the first beads are greater in height at their radially larger borderlines than at their radially smaller borderlines, and the first bead plate under no clamping load is in contact with both of the first and second intermediate plates.

A further object of the present invention is to provide a metal gasket wherein the second beads are greater in height at their radially larger borderlines than at their radially smaller borderlines, and the second bead plate under no clamping load is spaced apart at annular areas adjacent to the second apertures thereof from the first intermediate plate.

An additional object of the present invention is to provide a metal gasket wherein the first beads are greater in height at their radially larger borderlines than at their radially smaller borderlines, and the first bead plate under no clamping load is spaced apart at annular areas adjacent to the first apertures thereof from the flanges of the first intermediate plate.

Another object of the present invention is to provide a metal gasket wherein the first and second beads are each composed of plural bead lines formed around the first and second apertures, the radially smaller borderlines of the first beads opposing to the flanges is of the smaller borderlines of the bead lines of the first beads innermost with respect to their associated apertures, the radially larger borderlines of the first beads opposing to the second intermediate plate is of the larger borderlines of the bead lines of the first beads outermost with respect to their associated apertures.

Another object of the present invention is to provide a metal gasket wherein sealing stresses occurring in areas on the flanges of the first intermediate plate are dispersed over the areas uniformly while being greater than that in residual areas other than the areas on the flanges.

A further object of the present invention is to provide a metal gasket adapted for use in engines in such a manner that the gasket is interposed between a cylinder block and a cylinder head with the first bead plate being in confrontation to a deck-surface of the cylinder block.

An additional object of the present invention is to provide a metal gasket adapted for use in engines having cylinder holes lined with cylinder liners, wherein the sealing stresses at areas corresponding to interfaces between the cylinder holes and liners are less than that at areas corresponding to the flanges.

Upon the metal gasket as described above being interposed between the deck-surfaces of the cylinder block and cylinder head with the compressive clamping force, the double sections including the folded flanges of the first intermediate plate are greater in thickness than that of the first intermediate plate, resulting in the provision of means for compensating the clearance between the confronting deck-surfaces at areas just adjacent to the cylinder bore apertures, at which areas the clearance is apt to widen. The first bead plate is in engagement with the any one of the deck-surfaces at the crests of the first beads and the radially smaller and larger borderlines of the first beads are, respectively, in opposition to the first and second intermediate plates so that the surface pressure, or sealing stress, concentrates on the areas of the flanges and first beads so as to be rendered to disperse over the areas to provide the main sealing.

Adjusting the difference in thickness of the second intermediate plate and the flanges of the first intermediate plate may assist the beads in their resistance to being flattened whereby the stopper function may be controlled in quantity for protecting the beads from flattening out while the surface pressure, or the sealing stress, may be also regulated.

On the metal gasket being clamped compressively, the sealing stress generating in the areas of the flanges and first beads may disperse over the whole flanges and the sealing stress on the second intermediate plate is less than that on the flanges, so that the sealing performance to prevent the leakage of combustion gases may be improved at the areas of the flanges while the sealing stress on the deck-surfaces may disperse uniformly at the areas adjacent to the cylinder bores whereby the cylinder bores are protected from deformation. The first beads have first crests midway between their smaller and larger borderlines and the second intermediate plate is spaced apart from the apertures remoter than the larger borderlines of the first beads, so that the borderlines of the first beads may be adequately designed with a sufficient allowance with respect to both of the first and second intermediate plates.

Moreover, various modifications may be employed for providing more elasticity to the metal gaskets. A modification may be proposed in that a flange is spaced apart at its folded surface with a clearance from a major section of an intermediate plate and the clearance may contribute to render the flange more elastic or resistant against the sealing pressure. As a alternative, other clearances for more elasticity may be arranged between the areas neighboring the first apertures, or areas extending from the first apertures to the first beads, and flanges, or between the areas neighboring the second apertures, or the areas extending from the second apertures to the second beads, and the major section of the intermediate plate corresponding to the flanges.

On the other hand, the beads may be modified in design for eliminating the concentration of the sealing stress. To this end, The beads are of trapezoid in widthwise cross-section thereof, resulting in relaxing the concentration of the sealing stress on deformation of the beads while promoting the uniform distribution of the sealing stress. As an alternative, plural lines of the first and second beads may be formed for dispersing the sealing stress on the deck-surfaces to thereby provide the preferable sealing stress.

When the metal gasket constituted as described above is interposed between the confronting deck-surfaces of the cylinder components and clamped together by the clamping force, even cylinder blocks of cast aluminum alloy lacking in mechanical hardness, the metal gasket may provide the means for compensating the clearance between the confronting deck-surfaces at areas just adjacent to the cylinder bore, at which areas the clearance is apt to widen, so that the stopper function may be achieved owing to the difference in thickness of the first and second intermediate plates. Both the intermediate plates may support the deformation of the first beads on the first bead plate to relax the excessive concentration of the sealing stress with resulting in stable, steady sealing performance.

The difference in thickness of the first and second intermediate plates causes the sealing stress at the first beads of the first bead plate to offset towards the second intermediate plate so that the sealing stress may distribute over the flanges neighboring their associated apertures while becoming substantially flat over the flanges. As a result, deformation of the cylinder bores may be reduced as small as possible. This make it possible to improve the engine performance such as the fuel consumption rate, the oil consumption or the like, and further prevent the premature wear or the seizure due to unexpected friction occurring between the cylinder walls and piston rings.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 7:
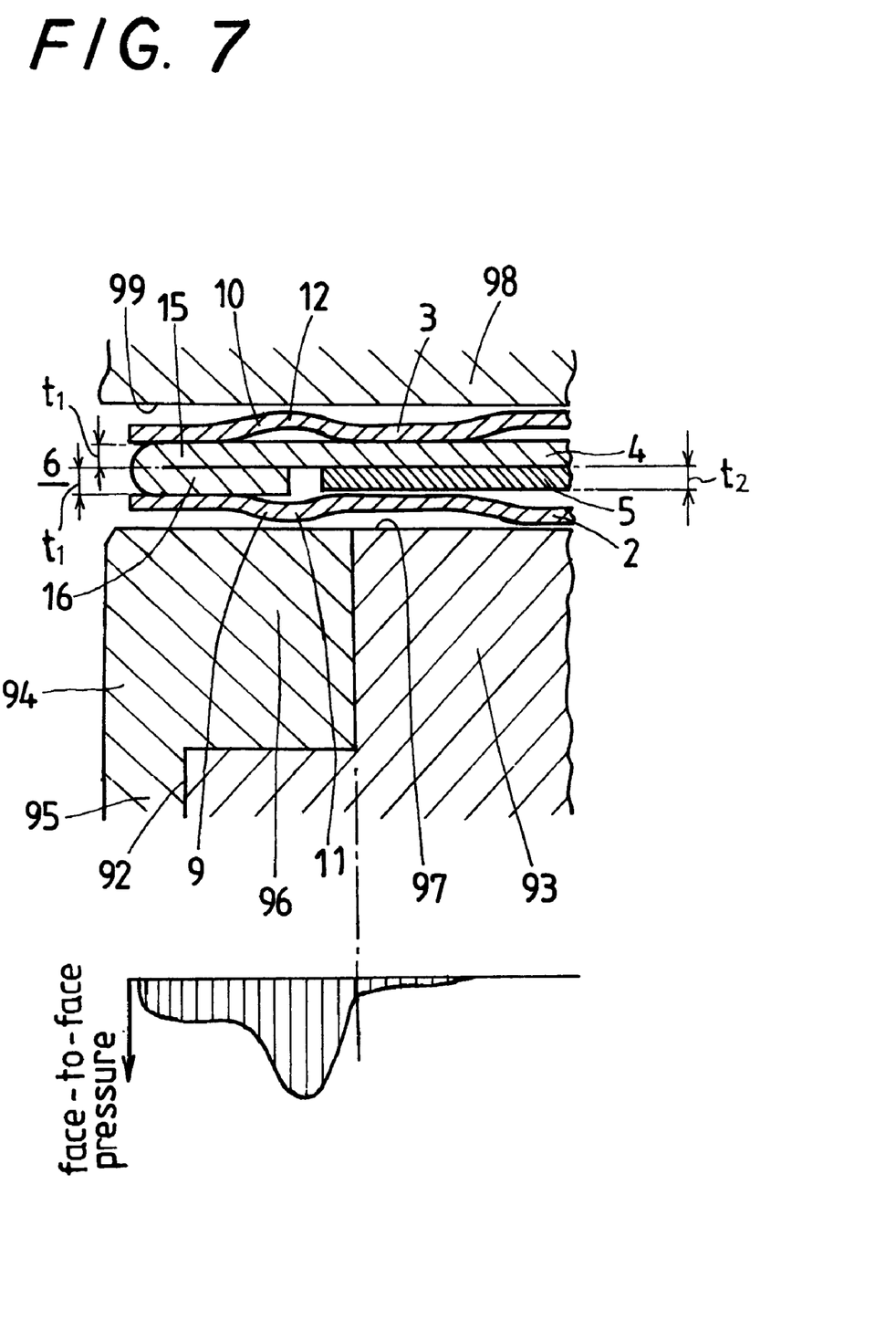
FIG. 7 is an illustration f or explaining the interposition of the metal gasket in FIGS. 1 and 2 between the confronting deck-surfaces of the open-deck type cylinder block and cylinder head and the distribution pattern of surface pressure, or sealing stress, occurring in the deck-surface of the cylinder block.

The metal gasket according to the present invention will be in detail explained below with reference to the preferred embodiments of the present invention shown in accompanying drawings. The metal gasket according to the present invention is a kind of head gaskets for sealing the clearance between a pair of the confronting surfaces of the cylinder block and cylinder head. This metal gasket is, as shown in FIG. 7, adapted for use in an internal combustion engine composed of a cylinder block 93 made of cast aluminum alloy. The cylinder block 93 is provided with holes 92 lined with special cast iron sleeves or liners which are each comprised of a smoothly finished liner section 95 along which a piston makes reciprocating movement, and a flanged section 96 for providing a deck-surface 97.

Figure 1:
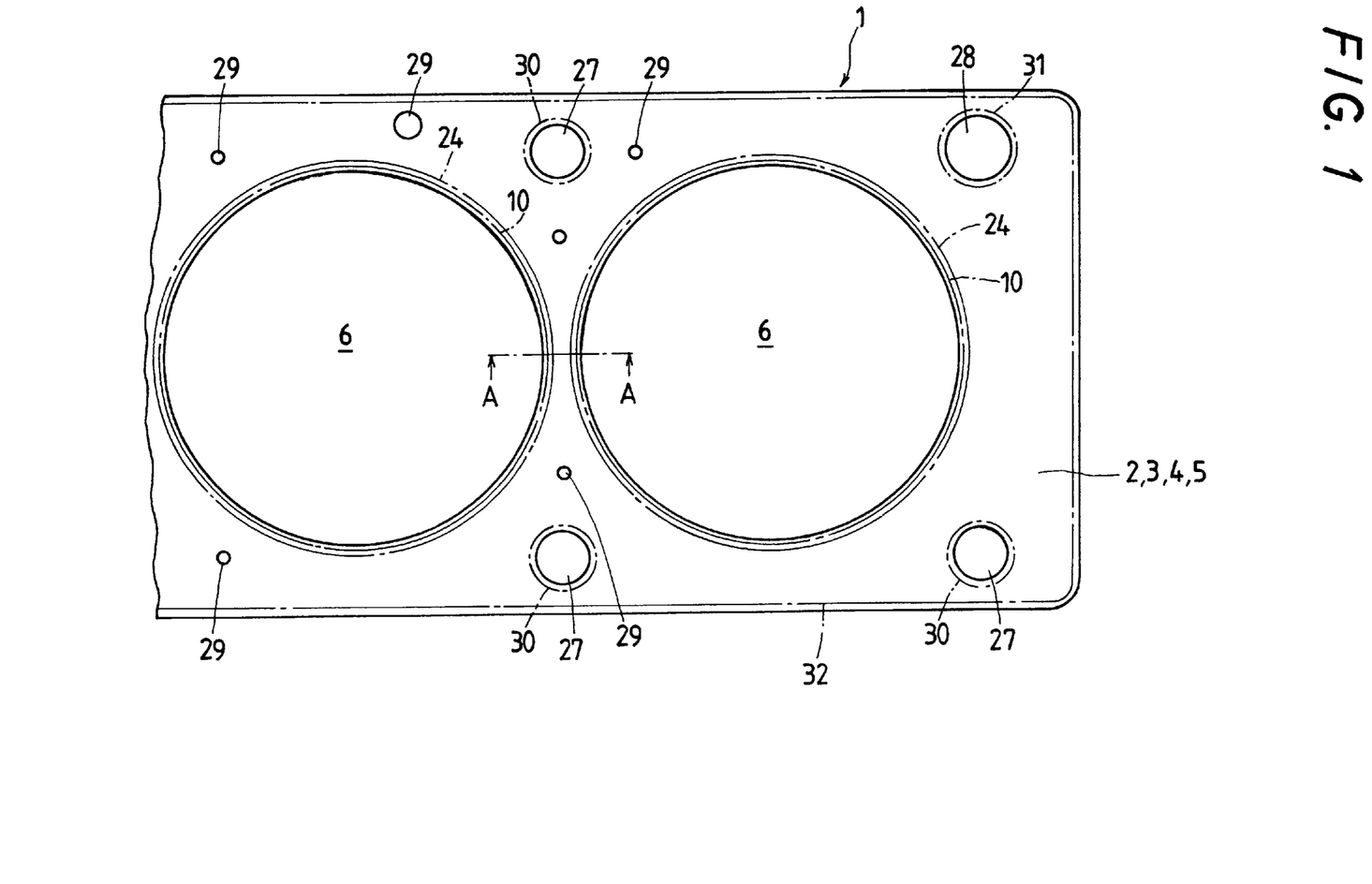
FIG. 1 is a plan view showing a preferred first embodiment of a metal gasket according to the present invention.
Figure 2:
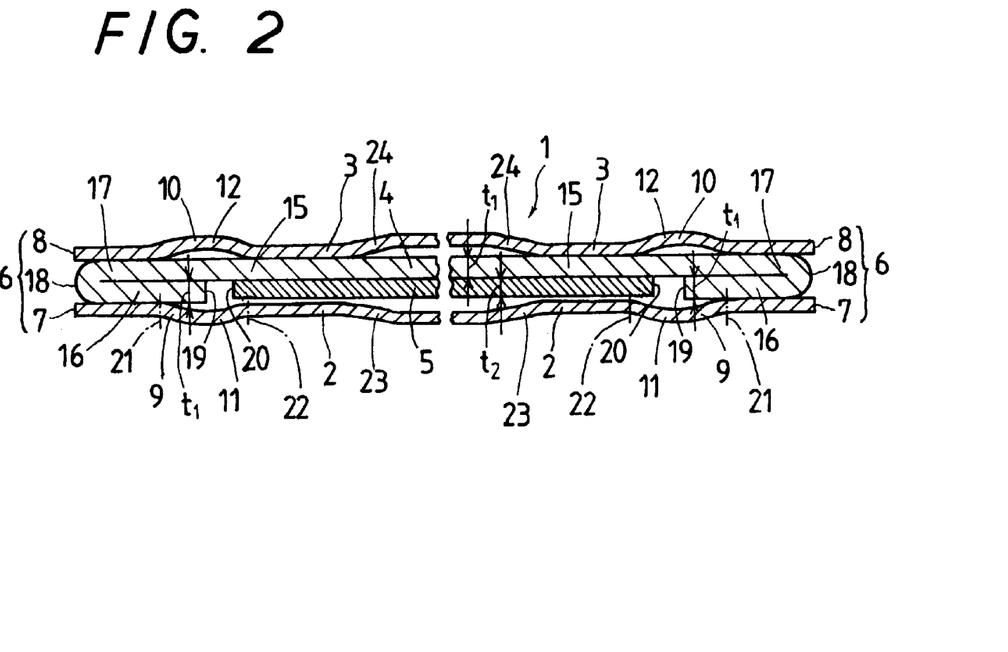
FIG. 2 is an enlarged cross-sectioned view along section line A—A of FIG. 1.

Referring to FIGS. 1 and 2, a metal gasket 1 has juxtaposed apertures 6 arranged in concentric alignment with cylinder bores in a multicylinder engine. The metal gasket 1 is comprised of a pair of bead plates of elastic metal sheet, or a first bead plate 2 and a second bead plate 3, a first intermediate plate 4 and a second intermediate plate 5, both intermediate plates being interposed between the bead plates 2 and 3. The first bead plate 2 is, as apparent from FIG. 7, arranged in contact with the cylinder block 93. The bead plates 2 and 3 are both provided with holes 27 for clamping bolts, knock holes 28 and water-flow passages 29. Corrugations or sealing beads are provided along contour areas of the metal gasket 1 and around all the apertures, holes and passages to seal their associated openings. The sealing beads associated with the bolt holes 27, knock holes 28 and contour areas of the bead plates 2 and 3 are of half beads 30, 31, 32 of relatively lower in offset, which are provided by embossing the associated areas in an resilient cantilever manner, because the sealing beads are allowed to be lower in critical sealing requirement in comparison with the beads around the cylinder bore apertures.

On production of the bead plates 2 and 3 a metal sheet, for example, stainless steel sheet higher in elasticity of the thickness $t_1$=from 0.15 mm to 0.25 mm is sheared into blanks which are then subject to metal-working process such as corrugation and followed by heat-treatment and surface-treatment for providing a predetermined tensile strength, ductility and hardness. The first intermediate plates 4 is made from a high-elasticity, stainless steel sheet of the thickness $t_2$=from 0.30 mm to 0.40 mm, and the second intermediate plate 5 is made from the stainless steel sheet of $t_3$=from 0.25 mm to 0.35 mm.

The first and second bead plates 2, 3 are respectively provided with first and second juxtaposed apertures 7, 8 which are in concentric alignment with each other. Corrugations, or first and second sealing beads 9, 10, are respectively formed around the apertures 7, 8 on the bead plates 2, 3. The sealing beads 9, 10 are of a type of full bead and provided separately around each of the apertures at the same location with respect to the associated apertures 6. The sealing beads 9, 10 are arranged in such a manner that the first and second annular crests 11, 12 thereof are offset in the reverse directions spaced apart from each other, or outwardly with respect to the confronting surfaces of the bead plates.

The first intermediate plate 4 has a major section 15 and flanges 16 folded back over the major section 15 so as to provide annular double sections 17 that are each formed from the flange 16 and a part of the major section 15 overlaid with the flange 16. Turns of the intermediate plate 4 define third apertures 18 in concentric alignment with the apertures 7, 8 each defined by the bead plates 2, 3. The length of the flange 16 forming the double section 17 is determined such that an extremity 19 thereof terminates at the crest 11 of the sealing bead 9 in the first bead plate 2, or somewhere midway between radially smaller and larger annular borderlines 21, 22 of the sealing bead 9 with respect to the associated aperture. It will be noted that the flanges 16 are in contact with only the radially smaller borderlines 21 of the beads 9 on the bead plate 2. The first intermediate plate 4 may be arranged at only the areas, which are defined between the adjoining cylinder bore apertures. As a alternative, the intermediate plate 4 may be made from a metal sheet of the size equal with the metal gasket 1, which sheet is perforated with apertures in correspondence with the cylinder bore apertures 6 and folded back to form the double sections 17.

The second intermediate plate 5 has a thickness $t_2$ less than that $t_1$ of the first intermediate plate 4 and makes in contact with the first intermediate plate 4 on the side where the flanges 16 are overlapped. The second intermediate plate 5 is further provided with apertures larger in diameter than the cylinder bore apertures 18. The second intermediate plate 5 makes contact with the larger borderlines 22 of the beads 9 on the bead plate 2 and opposes at its circular edges 20 against the extremities 19 of the flanges 16 with annular spacing therebetween. It is to be noted that the second intermediate plate 5 is arranged so as to make no interference with the flanges 16 of the first intermediate plate 4 somewhere midway between smaller and larger annular borderlines 21, 22 of the sealing beads 9.

Hence, the circular edges 20 of the intermediate plate 5 are somewhere midway between the larger annular borderlines 22 of the sealing bead 9 and the extremities 19 of the flanges 16 of the intermediate plates 4. The bead plates 2, 3 are provided with half beads 23, 24 remoter than the sealing beads 9, 10 with respect to the apertures 7, 8.

The bead plates 2, 3 are each coated at least any one side surface thereof with heat-proof, oil-proof non-metallic substance such as fluoroelastomer, acrylic silicone resin or the like of, for example, about $10\mu$ $20\mu$ in thickness. The non-metallic coating is to make no metal-to-metal contact of the bead plates with any one of the cylinder block and cylinder head to thereby help ensure the corrosion proof, durability and mechanical strength of the metal gasket. The non-metallic coating is, moreover, to compensate roughness on the machine-finished surfaces of the bead plates 2, 3 and the deck-surfaces of cylinder block and cylinder head, resulting in steady sealing performance. The metal gasket 1 is, as shown in FIG. 7, interposed between the opposing deck-surfaces 97, 99 of the cylinder block 93 and cylinder head 98 and compressively clamped together with the cylinder block and head by the action of clamping means such as bolts or the like. The deck-surface 97 on the cylinder block is defined by the coplanar surfaces of the cylinder block 93 and the flanged section 96 of the liner 94. The double section 17 of the intermediate plate 4 has the thickness of 2 times, or $2 \times t_1$, the thickness $t_1$ of the intermediate plate 4. The double section 17 is to compensate the clearances at the specific peripheral areas around the cylinder bores, at which areas the clearances are apt to undergo changes between the confronting deck-surfaces 97, 99 of the cylinder block 93 and cylinder head 98, whereby the adequate sealing against leakage of combustion gases may be provided between the confronting deck-surfaces 97, 99. The corrugations or sealing beads 9, 10 are forced against the deck-surfaces 97, 99 by the clamping load. With the sealing beads 9, 10 being deformed under the compressive clamping force, the annular crests 11, 12 of the sealing beads are brought into strong metal-to-metal contact with the deck-surfaces 97, 99 to thereby provide annular sealing lines at the specific areas around the apertures 6 where the secure, gas-tight sealing performance is required. It is to be noted that the annular sealing lines may positively prevent the fluids such as combustion gases or the like from leakage out of the apertures 6 through the clearances between the metal gasket 1 and deck-surfaces 97, 99.

The flanges 16 forming the double sections 17 have each the extremity 19 which terminates or somewhere midway between its associated smaller and larger annular borderlines 21, 22 of the sealing bead 10, or at the location corresponding to the crest 12. Consequently, compensating means may be provided by the overlapping relation of flanges 16 with the bead plates 2, 3 at the specific circumferential areas around their associated apertures, which areas are more adjacent to the associated apertures than the sealing beads 9, 10. The compensating means are allowed to widen under the clamping load. The radially-smaller borderlines 21 of the beads 9 are forced into contact with the flanges 16 while the radially-larger borderlines 22 are in correspondence with the second intermediate plate 5, so that the deformations of the sealing beads 9 are supported at the back of the beads 9 while the surface pressure, or sealing stress, concentrates on the beads 9.

FIG. 7 explains the distribution pattern of the surface pressure, or sealing stress, occurring in the metal gasket 1. On the metal gasket 1 being under clamping load, the sealing stress on the deck-surface 97 of the cylinder block 93, as seen from a graph in FIG. 7, concentrates on the location substantially correspondent to the larger borderline 22. That is, the distribution pattern of the sealing stress is offset towards the side remoter from the associated aperture 6, while the distribution of the sealing stress may be substantially uniform over the areas of the flanges 16 and made substantially flat over the whole areas of the beads 9. As a result, the increase in sealing performance may be achieved while the compensating means may be saved from the high sealing stress due to the clamping force. Accordingly, there is no concentration of the sealing stress on the specific areas neighboring around the apertures 6 whereby the cylinder bore apertures are protected from deformation owing to the excessive sealing stress. Adjusting the difference in thickness ($t_1-t_2$) of the intermediate plate 5 and the double section 17 of the intermediate plate 4 may assist the beads 9 in their resistance to being flattened whereby the stopper function may be controlled in quantity for protecting the beads 9 on the bead plate 2 from flattening out while the sealing stress may be also regulated.

Next, referring FIGS. 3 to 6, there are shown other embodiments of the metal gasket according to the present invention. In these FIGS. 3–6, like reference characters denote the components or parts like in their function to that in the metal gasket 1 in FIGS. 1 and 2. It is also noted that the structural arrangement around the apertures 6 is substantially equivalent with the metal gasket 1 and the detailed description therefor will be omitted hereinafter.

Figure 3:
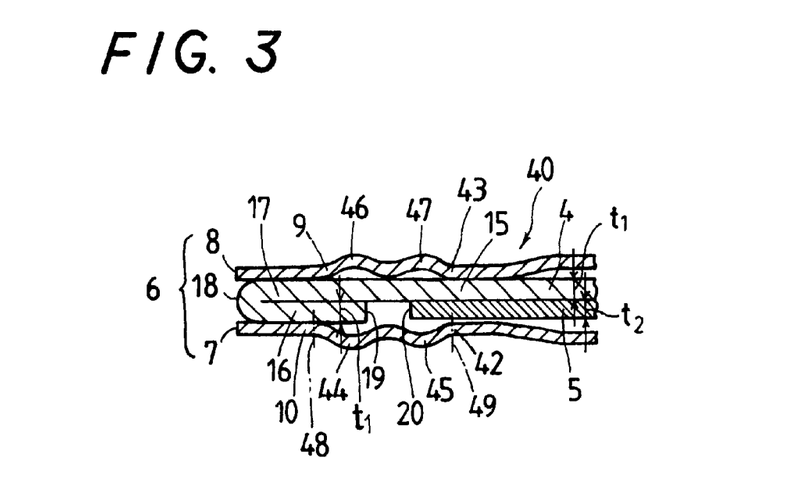
FIG. 3 is a fragmentary enlarged sectional view showing a second embodiment of the present invention.

Especially referring to FIG. 3 showing a second embodiment of the metal gasket in accordance with the present invention. A metal gasket 40 in FIG. 3 is different from the metal gasket 1 in the first embodiment in that two parallel corrugations or sealing beads are formed around the apertures 7, 8 of both first and second bead plates 42, 43. A first pair of beads 44, 45 is formed along the perimeter of the aperture 7 of the bead plate 42 while a second pair of beads 46, 47 is around the aperture 8 of the bead plate 43. The length of the flange 16 of the first intermediate plate 4 is determined such that the extremity 19 thereof terminates within a cross-span of the sealing bead 46 inside with respect to its associated aperture 6. Whereas the circular edge 20 of the intermediate plate 5 is within a cross-span of the sealing bead 45 outside with respect to its associated aperture 6.

Further, a radially smaller borderline 48 of the inside bead 44 is in contact with the flange 16 of the first intermediate plate 4 while a radially larger borderline 49 of the outside bead 45 is in confrontation with the second intermediate plate 5. On the metal gasket 40 being clamped down between the confronting deck-surfaces, the two pairs of sealing beads 44–47 make gas-tight sealing lines for providing sufficient sealing stress to increase the sealing performance on the deck-surfaces. It will be understood that the flange 16 forms the double section 17 in combination with the major section 15 of the first intermediate plate 4. Further referring FIG. 4 in which a third embodiment of the metal gasket according to this invention is illustrated.

Figure 4:
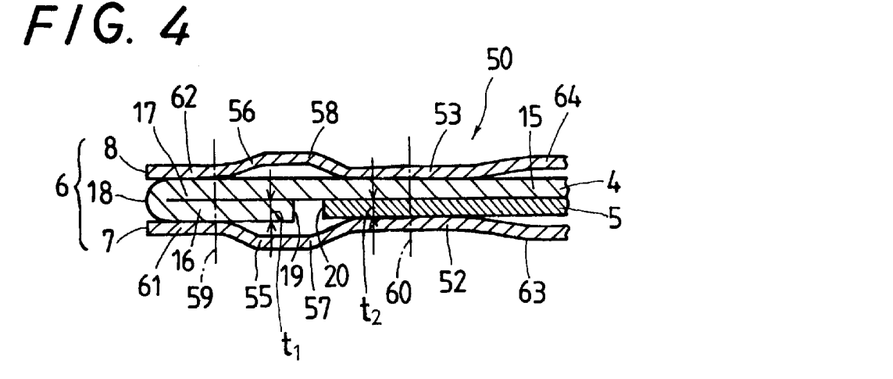
FIG. 4 is a fragmentary enlarged sectional view showing a third embodiment of the present invention.

A metal gasket 50 in FIG. 4 is substantially equivalent to the metal gasket 1 according to the first embodiment described above, excepting the corrugation or sealing bead has a cross section of trapezoid. First and second beads 55, 56 on first and second bead plates 52, 53 are each formed with first and second flat crests 57, 58. The first bead 55 is formed in a relatively-low, gently-sloping trapezoid having a height of about 1/30 times the span across between borderlines 59, 60 of itself. The second bead 56 is the same as the first bead. The flat crests 57, 58 of the beads 55, 56 each have a width of about in the range of from 1/3 to 1/6 times the span across between their associated borderlines. The first bead plate 52 under no sealing stress is in contact with the flange 16 of the first intermediate plate at an area 61 neighboring its associated aperture 7, or an area extending from the aperture 7 to the smaller borderline 59 of the bead 55. The bead plate 53 is the same for an area extending from the aperture 8 to the smaller borderline 62 as for the area 61 neighboring its associated aperture 7. The beads 55, 56 of trapezoid may render the sealing stress more effectively dispersive by the flat crests 57, 58 as compared with the ordinary bead having convex crest on which the sealing stress is apt to concentrate. The first embodiment of the metal gasket 1 may be applicable in regard to the arrangement relations of the bead plate 52 with the flange 16 of the first intermediate plate 4 and with the circular edge 20 of the second intermediate plate 5 and thus the explanation of these relation is left it out.

Figure 5:
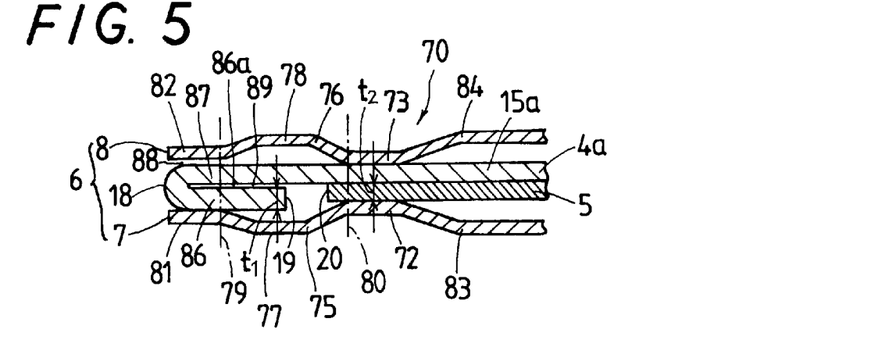
FIG. 5 is a fragmentary enlarged sectional view showing a fourth embodiment of the present invention.

Now referring to FIG. 5 showing a fourth embodiment of the metal gasket according to this invention.

A metal gasket 70 in FIG. 5 is unique in that sealing beads 75, 76 are modified in trapezoidal cross section thereof in such a manner that opposing slant sides of the trapezoid are made more steep, as compared with the metal gasket 50 in FIG. 4. As a result, the beads 75, 76 may be rendered more elastic or resistant against the sealing stress. The metal gasket 70 is different from the metal gasket 50 in that a flange 86 is spaced apart at its folded surface 86*a* with a clearance 89 from a double section 87 in a major section 15*a* of an intermediate plate 4*a*. The clearance 89 may contribute to render the double section 87 more elastic or resistant against the sealing stress. The clearance 89 is preferably determined to about 50 μm. Moreover the bead plate 72 is in contact with the flange 86 of the intermediate plate 4*a* at an area 81 neighboring its associated aperture 7, or an area extending from the aperture 7 to the smaller borderline 79 on the bead plate 72. While the metal gasket 70 is different from the metal gasket 50 in that the second bead plate 73 is spaced apart from the double section 87 of the intermediate plate 4*a* at the area 82 neighboring its associated aperture 8. Hence, The bead plate 73 is allowed to displace with following up the displacement of the deck-surface of the cylinder head on combustion whereby the stable, steady sealing stress and improved sealing performance may be obtained. The beads 75, 76 are preferred to have the height of in the range of from 1/5 to 1/15 times the bead width spanning across smaller and larger borderlines 79, 80 of the beads. The flat crests 77, 78 are recommended to have the width of in the range of about from 1/2 to 1/6 times the above-mentioned bead width. The clearance 88 has a span of in the range of from 0.3 to 0.7 times, preferably of 0.5 times, the height of the bead 76. It is to be noted that the half beads 83, 84 of the bead plates 72, 73 are substantially equivalent with the half beads 63, 64 in FIG. 4.

Finally a fifth embodiment of a metal gasket according to the present invention will be hereinafter described with reference to FIG. 6.

Figure 6:
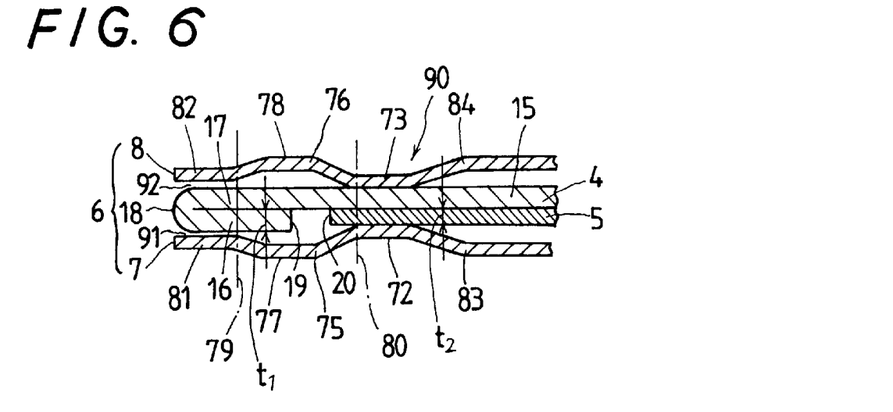
FIG. 6 is a fragmentary enlarged sectional view showing a fifth embodiment of the present invention.

Unlike the metal gasket 70 in FIG. 5 in which the flange 86 is spaced apart at its folded surface 86*a* with the clearance 89 from the double section 87 in the major section 15*a* of the intermediate plate 4*a*, a metal gasket 90 in FIG. 6 is unique in that a first clearance 91 is provided between the first bead plate 72 and the flange 16 of the intermediate plate 4 at the area 81 neighboring its associated aperture 7, or the area extending from the aperture 7 to the smaller borderline 79 on the bead plate 72, while a second clearance is also provided between the second bead plate 73 and the double section 17 of the intermediate plate 4 at the area 82 extending from the aperture 8 to the smaller borderline 79 on the bead plate 73. In addition the second bead plate 73 is allowed to displace with following up the displacement of the deck-surface of the cylinder head on combustion, the first bead plate 72 is also allowed to deform with following up the displacement of the deck-surface of the cylinder block so that the sealing stress may be rendered stable and the sealing performance may be improved remarkably.

While the present invention has been described in its preferred embodiments, it is to be distinctly understood that the invention is not limited thereto but may be otherwise variously embodied within the scope of the following claims. For instance, the bead plate 3 in contact with the cylinder head 98 may be made greater in thickness than the bead plate 2 on the side of the cylinder block 93 to thereby provide an increase in durability against to variations in the stress and/or heat load exerted on the bead plates. The sealing beads on the bead plates may be changed in their height and width according to the circumferentially angular zone around their associated aperture 6. On compact engines, for example, a pair of sealing beads may be extremely reduced in width at narrow zones between the adjoining apertures 6, as compared with the residual zones in the bead plates. The beads may be further enhanced in height at narrow zones between the adjoining apertures 6, at which zones the increased sealing stress should be required as compared with the residual zones in the bead plates. It will be obvious to those skilled in the art that the metal gasket according to the present invention is not limited to use in the confronting surfaces of the cylinder block and cylinder head. It may of course be applied with equal utility to other engine components, or the connection of the exhaust manifolds with the cylinder heads.

What is claimed is:

1. A metal gasket comprising a first bead plate formed with first beads extending around first cylinder bore apertures, a second bead plate formed with second beads extending with coincidence with the first beads around second cylinder bore apertures which are in concentric alignment with the first apertures, a first intermediate plate having third apertures in alignment with the first and second apertures and flanges folded back on a side confronting the first bead plate, the first intermediate plate being interposed between the first and second bead plates, a second intermediate plate having a thickness less than that of the flanges of the first intermediate plate and further having apertures larger in diameter than the third apertures, the second intermediate plate being in contact with the first intermediate plate on the side where the flanges are overlapped, the first and second beads being arranged in such a manner that first and second crests thereof are offset in outward directions spaced apart from each other with respect to confronting surfaces of the bead plates, the first beads being defined by borderlines smaller radially of their associated apertures and borderlines larger radially of their associated apertures, the flanges being in opposition to the radially smaller borderlines of the first beads, the second intermediate plate being in opposition to the radially larger borderlines of the first bead plate, and the flanges of the first intermediate plate being arranged in opposition to the second intermediate plate so as to make no interference between extremities of the flanges and circular edges around the apertures of the second intermediate plate somewhere between the smaller and larger annular borderlines of the first beads, wherein the first and second beads are each equal in height at both of radially smaller and larger borderlines thereof, the first bead plate under no clamping load is in contact with the flanges of the first intermediate plate while being spaced apart from the second intermediate plate, and the second bead plate is in contact with the first intermediate plate.

2. A metal gasket comprising a first bead plate formed with first beads extending around first cylinder bore apertures, a second bead plate formed with second beads extending in coincidence with the first beads around second cylinder bore apertures which are in concentric alignment with the first apertures, a first intermediate plate having third apertures in alignment with the first and second apertures and flanges folded back on a side confront the first bead plate, the first intermediate plate being interposed between the first and second bead plates, a second intermediate plate having a thickness less that that of the flanges of the first intermediate plate and further having apertures larger in diameter than the third apertures, the second intermediate plate being in contact with the first intermediate plate on the side where the flanges are overlapped, the first and second beads being arranged in such a manner that first and second crests thereof are offset in outward directions spaced apart from each other with respect to confronting surfaces of the bead plates, the first beads being defined by borderlines smaller radially of their associated apertures and borderlines larger radially of their associated apertures, the flanges being in opposition to the radially smaller borderlines of the first beads, the second intermediate plate being in opposition to the radially larger borderlines of the first bead plate, and the flanges of the first intermediate plate being arranged in opposition to the second intermediate plate so as to make no interference between extremities of the flanges and circular edges around the apertures of the second intermediate plate somewhere between the smaller and larger annular borderlines of the first beads, wherein the first beads are greater in height at their radially larger borderlines than at their radially smaller borderlines, and the first bead plate under no clamping load is in contact with both of the first and second intermediate plates.

3. A metal gasket comprising a first bead plate formed with first beads extending around first cylinder bore apertures, a second bead plate formed with second beads extending in coincidence with the first beads around second cylinder bore apertures which are in concentric alignment with the first apertures, a first intermediate plate having third apertures in alignment with the first and second apertures and flanges folded back on a side confronting the first bead plate, the first intermediate plate being interposed between the first and second bead plates, a second intermediate plate having a thickness less than that of the flanges of the first intermediate plate and further having apertures larger in diameter than the third apertures, the second intermediate plate being in contact with the first intermediate plate on the side where the flanges are overlapped, the first and second beads being arranged in such a manner that first and second crests thereof are offset in outward directions spaced apart from each other with respect to confronting surfaces of the bead plates, the first beads being defined by borderlines smaller radially of their associated apertures and borderlines larger radially of their associated apertures, the flanges being in opposition to the radially smaller borderlines of the first beads, the second intermediate plate being in opposition to the radially larger borderlines of the first bead plate, and the flanges of the first intermediate plate being arranged in opposition to the second intermediate plate so as to make no interference between extremities of the flanges and circular edges around the apertures of the second intermediate plate somewhere between the smaller and larger annular borderlines of the first beads, wherein the second beads are greater in height at their radially larger borderlines than at their radially smaller borderlines, and the second bead plate under no clamping load is spaced apart at annular areas adjacent to the second apertures thereof from the first intermediate plate.

4. A metal gasket comprising a first bead plate formed with first beads extending around first cylinder bore apertures, a second bead plate formed with second beads extending in coincidence with the first beads around second cylinder bore apertures which are in concentric alignment with the first apertures, a first intermediate plate having third apertures in alignment with the first and second apertures and flanges folded back on a side confronting the first bead plate, the first intermediate plate being interposed between the first and second bead plates, a second intermediate plate having a thickness less than that of the flanges of the first intermediate plate and further having apertures larger in diameter than the third apertures, the second intermediate plate being in contact with the first intermediate plate on the side where the flanges are overlapped, the first and second beads being arranged in such a manner that first and second crests thereof are offset in outward directions spaced apart from each other with respect to confronting surfaces of the bead plates, the first beads being defined by borderlines smaller radially of their associated apertures and borderlines larger radially of their associated apertures, the flanges being in opposition to the radially smaller borderlines of the first beads, the second intermediate plate being in opposition to the radially larger borderlines of the first bead plate, and the flanges of the first intermediate plate being arranged in opposition to the second intermediate plate so as to make no interference between extremities of the flanges and circular edges around the apertures of the second intermediate plate somewhere between the smaller and larger annular borderlines of the first beads, wherein the first beads are greater in height at their radially larger borderlines than at their radially smaller borderlines, and the first bead plate under no clamping load is spaced apart at annular areas adjacent to the first apertures thereof from the flanges of the first intermediate plate.

* * * * *